(12) United States Patent
Uemura et al.

(10) Patent No.: US 6,439,579 B2
(45) Date of Patent: Aug. 27, 2002

(54) LAMINATED GASKET

(75) Inventors: Hiroshi Uemura, Daito; Kiyoshi Sugimoto, Higashiosaka; Kazuya Yoshijima, Okazaki, all of (JP)

(73) Assignee: Nippon Gasket Company Ltd., Osaka (JP)

( * ) Notice: Subject to any disclaimer, the term of this patent is extended or adjusted under 35 U.S.C. 154(b) by 60 days.

(21) Appl. No.: 09/795,495

(22) Filed: Mar. 1, 2001

(30) Foreign Application Priority Data

Apr. 3, 2000 (JP) ........................................ 2000-100148

(51) Int. Cl.⁷ ................................................ F02F 11/00
(52) U.S. Cl. ...................... 277/595; 277/591; 277/593; 277/594
(58) Field of Search ............................... 277/591, 593, 277/594, 595, 600, 650

(56) References Cited

U.S. PATENT DOCUMENTS

| | | | | |
|---|---|---|---|---|
| 3,549,157 A | * | 12/1970 | Bennigsen | 277/650 |
| 3,653,674 A | | 4/1972 | Bennigsen | |
| 4,369,980 A | * | 1/1983 | Backlin | 277/593 |
| 4,531,750 A | * | 7/1985 | Herrington | 277/650 |
| 4,834,399 A | | 5/1989 | Udagawa et al. | |
| 5,895,054 A | * | 4/1999 | Miyaoh et al. | 277/595 |
| 6,058,918 A | * | 5/2000 | Noetzlin | 277/591 |
| 6,164,662 A | * | 12/2000 | Uemura et al. | 277/593 |
| 6,180,167 B1 | | 1/2001 | Majewski et al. | |

FOREIGN PATENT DOCUMENTS

| | | |
|---|---|---|
| JP | 46-43 | 1/1971 |
| JP | 63101575 A | 5/1988 |
| JP | 1-118147 | 8/1989 |
| JP | 4-66457 | 6/1992 |
| JP | 05-052268 | 3/1993 |
| JP | 10-61773 | 3/1998 |

* cited by examiner

*Primary Examiner*—Lynne H. Browne
*Assistant Examiner*—Enoch E Peavey
(74) *Attorney, Agent, or Firm*—Rader, Fishman & Grauer, PLLC

(57) ABSTRACT

A laminated gasket is provided, which ensures desired bore sealing surface pressures on the side of a cylinder head and on the side of a cylinder block, which is excellent in sealing ability and durability preferably by virtue of its double sealing function and which has a comparatively simple structure. This gasket has a core plate and elastic plates laminated to both surfaces of the core plate. The core plate has thin-walled portions each surrounding a bore opening and a thick-walled portion extending outwardly from each thin-walled portion. The elastic plates respectively have folded-back portions each of which is formed so as to create, together with a base portion, a clearance around its associated bore opening.

10 Claims, 7 Drawing Sheets

LAMINATED GASKET

TECHNICAL FIELD

The present invention relates to laminated gaskets used for providing seals, for example, between the opposed surfaces of the cylinder block and cylinder head of an engine.

BACKGROUND ART

For sealing the joint between the opposed surfaces of the cylinder block and cylinder head of an engine, there have been widely used gaskets composed of elastic metal plates. Such laminated gaskets are often designed such that elastic metal plates having beads or folded-back portions are laminated to another structural plate in order to enhance a sealing effect particularly in the areas around the peripheries of bore openings.

For producing lightweight and small-sized engines, there are two concurrent noticeable tendencies in the recent development of engines. One is a trend toward making all of the structural members of an engine from aluminum alloys and the other is a trend toward higher combustion pressure for seeking higher output, higher performance engines. Although more lightweight cylinder heads and cylinder blocks etc. can be produced from aluminum alloys, compared to cases where iron materials are used, the use of aluminum alloys disadvantageously provides poor rigidity which causes considerable deformation in the cylinder head and the cylinder block when clamping the cylinder head gasket, so that it becomes difficult to obtain uniform static sealing surface pressure around the peripheries of the bore openings. In addition, during an operation of the engine, the relative displacement of the cylinder head and the cylinder block is increased by high pressure within the cylinders and heat, which leads to difficulty in achieving uniform dynamic sealing surface pressure.

To solve this problem, the following cylinder head gaskets have been proposed and put to practical use, which have structures of high freedom to conform to slips and deformation occurring around the peripheries of the bore openings.

(1) Japanese Patent Publication (KOKAI) No. 63-101575 (1988)

This publication discloses a gasket having a structure in which a plate, which has beads and folded-back portions including comparatively large clearances, is overlaid on another structural plate.

(2) Japanese Utility Model Publication (KOKAI) No. 1-118147 (1989)

This publication discloses a gasket having a structure in which a plate has folded-back portions having α-shaped clearances around a bore opening and a bead, and another plate is placed so as not to overlap with the folded-back portions.

(3) Japanese Utility Model Publication (KOKAI) No. 4-66457 (1992), Japanese Patent Publication (KOKAI) No. 5-52268 (1993)

These publications disclose a gasket having a four-plate-structure in which a first intermediate plate having folded-back stoppers and a second intermediate plate having step-like stoppers are sandwiched between two bead plates. The folded-back stoppers for preventing entire bead compression are formed only on a side of either of the bead plates.

(4) Japanese Patent Publication (KOKAI) No. 10-61773 (1998)

This publication discloses a structure in which bead plates are laminated to both sides of an intermediate plate and thickness increasing stopper portions made from a sintered material are formed on the bead plates.

These conventional gaskets have, however, revealed the following disadvantages. The gasket of column (1) has a problem in its conformability to the deformation of the cylinder head and cylinder block since the comparatively large clearance formed in the folded-back portion is a grommet-like folded portion. Neither of the gaskets described in columns (1) and (2) have an outer laminated plate which directly contacts the folded-back portions and they are in the form of a single layer at the parts around the bore openings so that it is difficult to keep springiness and therefore a surface pressure adjustment for bore sealing cannot be easily performed.

In the gasket of the four-plate-structure described in column (3), the distortion of the second intermediate plate having the step-like stopper is virtually unexpected and the absence of the distortion causes no problem in the performance of the gasket. Therefore, virtually no effect of the folded-back stopper formed on one side is transmitted through the thick, second intermediate plate to the cylinder head surface or the cylinder block surface on the opposite side. In case where the folded-back stopper is positioned toward the cylinder block side, as a whole the gasket when tightening and in use cannot follow the deformation occurring on the cylinder head, or vice versa. It becomes therefore difficult to simultaneously maintain desired sealing surface pressures on the cylinder head side and on the cylinder block side. It should be noted herein that where the cylinder block is made of cast iron whereas the cylinder head is made of an aluminum alloy, deformation can be dealt with in some degree which may be somehow insufficient though, by appropriately adjusting the orientation of the gasket of the four-plate-structure. However, the problems described above are dominant in the case of engines entirely made of aluminum alloys such as the latest open deck type engines.

In the gasket described in column (4), since the thickness increasing stopper is made of a sintered material, increased costs due to the material and the sintering process are unavoidable.

The invention has been directed to overcoming the foregoing problems and it is therefore a prime object of the invention to provide a laminated gasket of a comparatively simple structure, in which desired bore sealing surface pressures on both of the cylinder head side and the cylinder block side can be ensured by use of elastic plates having at least folded-back portions formed so as to follow the deformations of the cylinder head and the cylinder block and in which excellent sealing ability and durability can be achieved preferably by a double sealing function.

DISCLOSURE OF THE INVENTION

The above object can be achieved by a laminated gasket constructed according to a first aspect of the invention, which has a core plate and elastic plates laminated to both surfaces of the core plate, wherein the core plate has thin-walled portions each of which surrounds a bore opening and a thick-walled portion extending outwardly from the thin-walled portions, and wherein each of the elastic plates has (a) folded-back portions each of which is formed so as to create, together with a base portion, a clearance around its associated bore opening and (b) beads each of which is formed outside its associated folded-back portion.

According to the invention, since the folded-back portions formed on the elastic plates are each formed so as to create a clearance together with a base portion, the clearances can remain as much as possible when the elastic plates are tightened between the opposed surfaces of the cylinder head and the cylinder block, so that bore seal lines can be formed by these folded-back portions. In addition, a double seal structure composed of a first seal provided by the folded-back portions formed on the elastic plates and a second seal provided by the beads can be achieved and thus, good sealing effects can be achieved with a relatively simple structure. Since the thin-walled portions of the core plate allow the folded-back portions having a clearance and formed on the elastic plates to maintain springiness, the gasket can conform to the deformation of the cylinder head or cylinder block when the gasket is tightened or when the engine is operated. Additionally, since the elastic plate is provided for both surfaces of the core plate, even if deformation occurs from both of the cylinder head side and the cylinder block side when the gasket is tightened, the elastic plates flexibly receive the stresses so that surface pressures on both sides can be distributed as desired. Further, the gasket can easily follow the deformation of the cylinder head or the cylinder block, exerting good sealing effects, during an operation of the engine. Accordingly, a gasket having excellent sealing ability and durability can be achieved.

The gasket of the invention may be structured such that each of the thin-walled portions is an inclined thin-walled portion which gradually becomes thinner toward its associated bore opening and such that the folded-back portions and beads of the elastic plates are in contact with their associated inclined thin-walled portion. In such a structure, the folded-back portions of the elastic plates can be allowed to maintain springiness by the inclined thin-walled portions of the core plate when the gasket is tightened or the engine is operated.

Alternatively, the gasket of the invention may be structured such that each of the thin-walled portions is a step-like thin-walled portion which is formed by thinning a part on the side of each bore opening and such that the folded-back portions of the elastic plates are in contact with their associated step-like thin-walled portion whereas the beads of the elastic plates are in contact with the thick-walled portion.

According to a second aspect of the invention, there is provided a laminated gasket which has a core plate and elastic plates laminated to both surfaces of the core plate,
wherein the core plate has thin-walled portions each of which surrounds a bore opening and a thick-walled portion extending outwardly from the thin-walled portions, and
wherein each of the elastic plates has (a) folded-back portions each of which is formed so as to create, together with a base portion, a clearance around its associated bore opening and (b) seal portions each of which is made of a soft sealing material and positioned outside its associated folded-back portion.

According to the invention, a double seal structure can be achieved, which is composed of a first seal provided by the folded-back portions formed on the elastic plates and a second seal provided by the seal portions formed outside the folded-back portions. With this arrangement, the same effect as obtained by the first aspect can be achieved.

The invention may be arranged such that each of the thin-walled portions is an inclined thin-walled portion which gradually becomes thinner toward its associated bore opening and such that the folded-back portions of the elastic plates are in contact with their associated inclined thin-walled portion.

The invention may be alternatively arranged such that each of the thin-walled portions is a step-like thin-walled portion which is formed by thinning a part on the side of each bore opening and such that the folded-back portions of the elastic plates are in contact with their associated step-like thin-walled portion.

According to a third aspect of the invention, there is provided a laminated gasket which has a core plate and elastic plates laminated to both surfaces of the core plate,
wherein the core plate has (a) thin-walled portions each of which surrounds a bore opening, (b) a thick-walled portion extending outwardly from the thin-walled portions and (c) seal portions made of a soft sealing material and formed on the thin-walled portions and/or the thick-walled portion,
wherein each of the elastic plates has folded-back portions each of which is formed so as to create, together with a base portion, a clearance around its associated bore opening.

According to the invention, a double seal structure can be achieved, which is composed of a first seal provided by the folded-back portions formed on the elastic plates and a second seal provided by the seal portions formed on the thin and/or thick-walled portion of the core plate. With this arrangement, the same effect as obtained by the first aspect can be achieved.

The invention may be arranged such that each of the thin-walled portions is an inclined thin-walled portion which gradually becomes thinner toward its associated bore opening and such that the folded-back portions of the elastic plates are in contact with their associated inclined thin-walled portion.

The invention may be alternatively arranged such that each of the thin-walled portions is a step-like thin-walled portion which is formed by thinning a part on the side of each bore opening, such that the folded-back portions of the elastic plate are in contact with their associated step-like thin-walled portion, and such that the radial length of the base portions of the elastic plates is within the range equal to the radial length of the step-like thin-walled portions and the elastic plates are not in contact with the thick-walled portion of the core plate. This arrangement provides a much simpler structure in which no elastic plates are laminated to the thick-walled portion of the core plate.

Another alternative arrangement is such that each of the thin-walled portions is a step-like thin-walled portion which is formed by thinning a part on the side of each bore opening, such that the folded-back portions of each elastic plate are in contact with their associated step-like thin-walled portion, and such that the base portion of each elastic plate holds an end of the step-like thin-walled portion and the elastic plates are not in contact with the thick-walled portion of the core plate. Similarly to the above arrangements, this arrangement provides a much simpler structure.

BEST MODE FOR CARRYING OUT THE INVENTION

Referring now to the accompanying drawings, laminated gaskets will be hereinafter described according to preferred embodiments of the invention.

Figure 1:
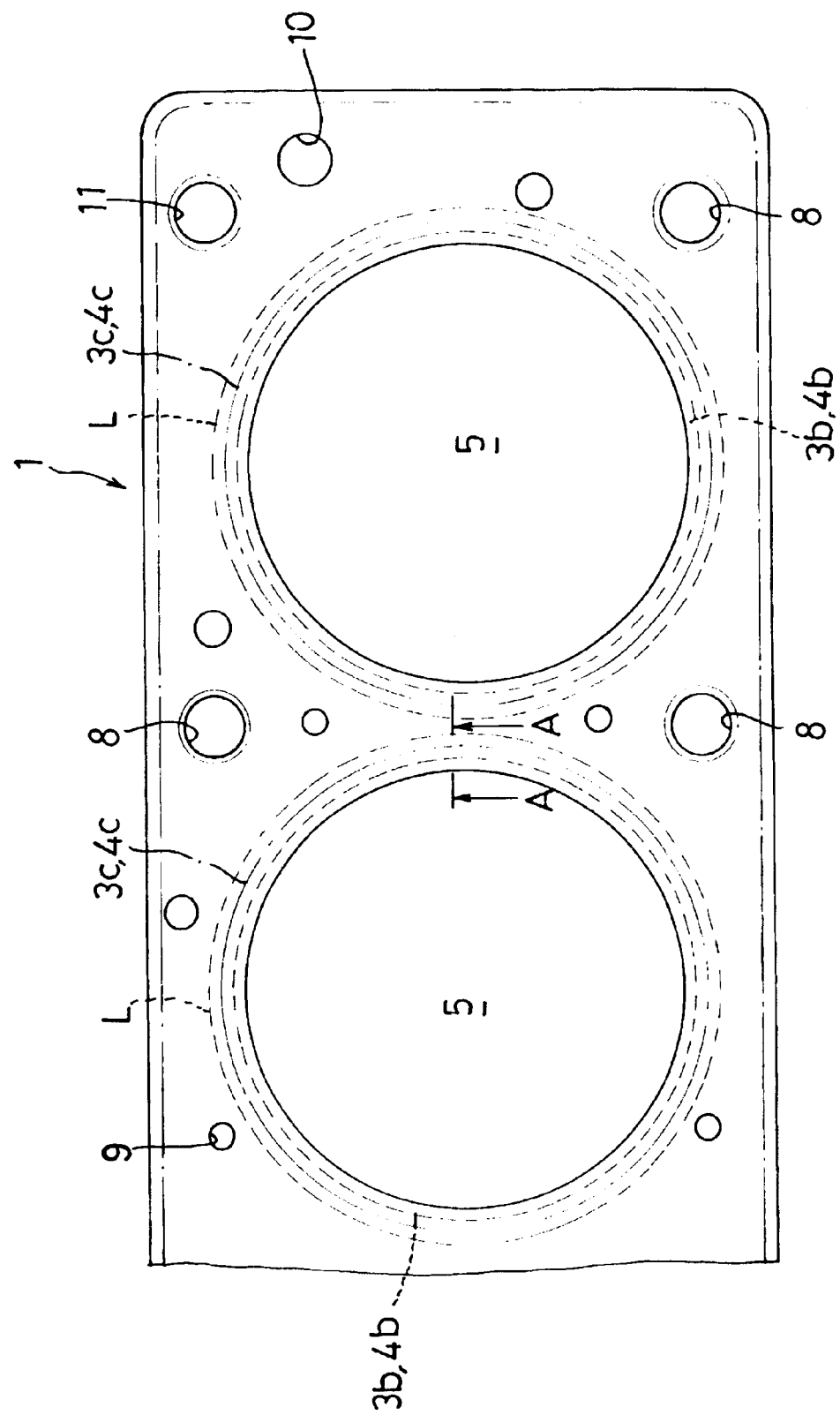
FIG. 1 is a partial plan view of a laminated gasket constructed according to a first embodiment of the invention.
Figure 2:
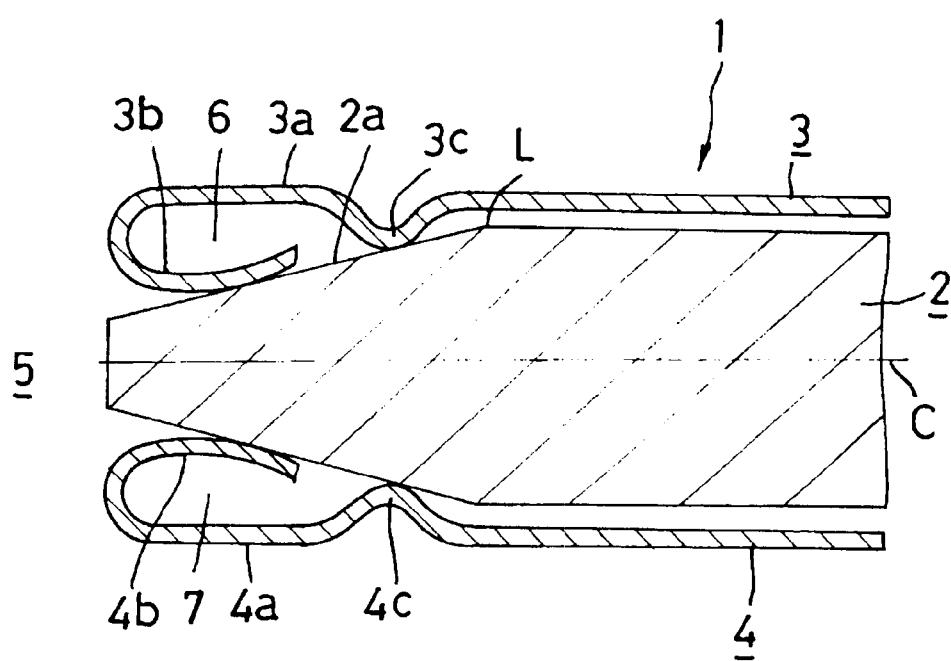
FIG. 2 is a sectional view taken along line A—A of FIG. 1.

FIG. 1 shows a partial plan view of a laminated gasket constructed according to a first embodiment of the invention and FIG. 2 shows a sectional view taken along line A—A of FIG. 1.

A laminated gasket 1 according to the first embodiment is used for sealing the joint between the opposed surfaces of the cylinder head and cylinder block of a multi-cylinder engine. The laminated gasket 1 is comprised of a core plate 2 and elastic plates 3, 4 laminated to both sides of the core plate 2, respectively.

The core plate 2 is formed to be relatively thick from a steel plate such as SECC and has inclined thin-walled portions 2a each positioned around each bore opening 5, whereas elastic plates 3, 4 are formed from a metal plate such as SUS 301, having base portions 3a, 4a and folded-back portions 3b, 4b. Each folded-back portion 3b (4b) is formed so as to create a clearance 6(7) around each bore opening 5, together with a base portion 3a (4a). The elastic plates 3, 4 have annular beads 3c and 4c respectively, such that the annular beads 3c, 4c are positioned outside the fold-back portions 3b, 4b, encircling them, respectively.

Each elastic plate 3(4) is laminated to the core plate 2 such that the folded-back portion 3b(4b) and the bead 3c(4c) are brought into contact with the inclined thin-walled portion 2a of the core plate 2. In other words, the folded-back portions 3b, 4b and beads 3c, 4c of the elastic plates 3, 4 are located closer to their associated bore opening 5 than a thin-walled portion boundary line L on the elastic plates 3, 4. In the laminated condition, the assembly of the core plate 2 and the elastic plates 3, 4 is perfectly symmetrical with respect to a center line C of the cross section of the core plate 2, the center line C extending in the same direction as the extending direction of the core plate 2.

The core plate 2 and the elastic plates 3, 4 respectively have bolt holes 8, water holes 9, oil holes 10, knock and bolt holes 11 and others which are so formed as to pierce through these plates.

In the laminated gasket 1 of the present embodiment, the folded-back portions 3b, 4b in contact with the core plate 2 provide a first seal around each bore opening 5 while the beads 3c, 4c in contact with the core plate 2 provide a second seal, whereby the gasket 1 has a double sealing function. The inclined thin-walled portion 2a formed on the core plate 2 and the beads 3c, 4c allow the folded-back portions 3b, 4b of the elastic plates 3, 4 having clearances 6, 7 to maintain their springiness, so that when the laminated gasket 1 is tightened between the opposed surfaces of the cylinder head and the cylinder block, the clearances 6, 7 can remain as much as possible. In addition, by virtue of the structure in which the elastic plates 3, 4, which are provided with the folded-back portions 3b, 4b including the clearances 6, 7 and with the beads 3c, 4c, are positioned on both sides of the core plate 2 respectively, the laminated gasket 1 can flexibly receive the stress of deformations which occur from the cylinder head side and the cylinder block side when the laminated gasket 1 is tightened. Consequently, surface pressures on both of the cylinder head side and the cylinder block side can be distributed as desired. Further, the laminated gasket 1 can easily conform to the deformation of the cylinder head or the cylinder block when the engine is operated.

Figure 3:
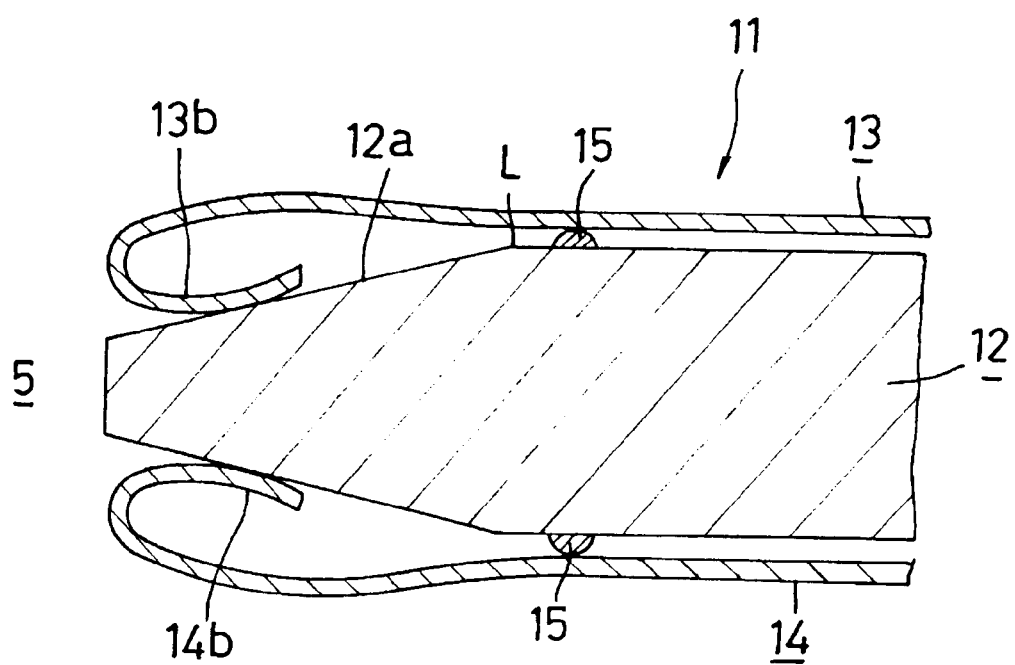
FIG. 3 is a sectional view of a laminated gasket constructed according to a second embodiment of the invention.

FIG. 3 shows a sectional view of a laminated gasket constructed according a second embodiment of the invention.

In a laminated gasket 11 of the second embodiment, a core plate has inclined thin-walled portions 12a whereas elastic plates 13, 14 have folded-back portions 13b, 14b around each bore opening 5, respectively, but beads like those in the first embodiment are not formed. Instead of beads, seal portions 15 made of a soft sealing material such as graphite or urethane type high polymer materials are formed on the core plate 12, being positioned outside the thin-walled portion boundary line L. The seal portions 15 provide a second seal. It should be noted that the seal portions of the example shown in FIG. 3 are annular bead-like seal portions encircling the inclined thin-walled portion. With this arrangement, the same function and effect as those of the first embodiment can be achieved.

While the seal portions 15 are formed on the core plate 12, being positioned outside the thin-walled portion boundary line L in the present embodiment, the seal portions 15 may be formed on the elastic plates 13, 14 and positioned inside the thin-walled portion boundary line L, as far as they are positioned outside the folded-back portions 13b, 14b.

Figure 4:
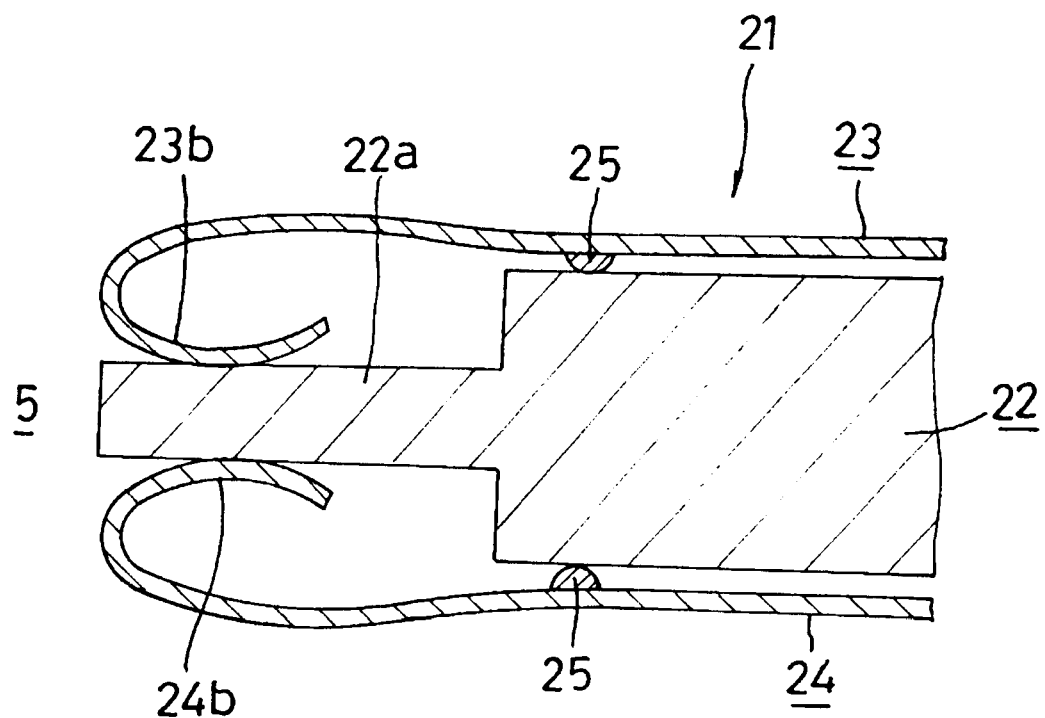
FIG. 4 is a sectional view of a laminated gasket constructed according to a third embodiment of the invention.

FIG. 4 shows a sectional view of a laminated gasket constructed according to a third embodiment of the invention. A laminated gasket 21 according to the third embodiment has the same structure as that of the second embodiment except that the inclined thin-walled portion of the second embodiment is replaced by a step-like thin-walled portion 22a formed on a core plate 22 and that folded-back portions 23b, 24b formed on elastic plates 23, 24 are in contact with the step-like thin-walled portion 22a. In this example, the elastic plates 23, 24 are respectively provided with a seal portion 25 made of a soft sealing member.

Figure 5:
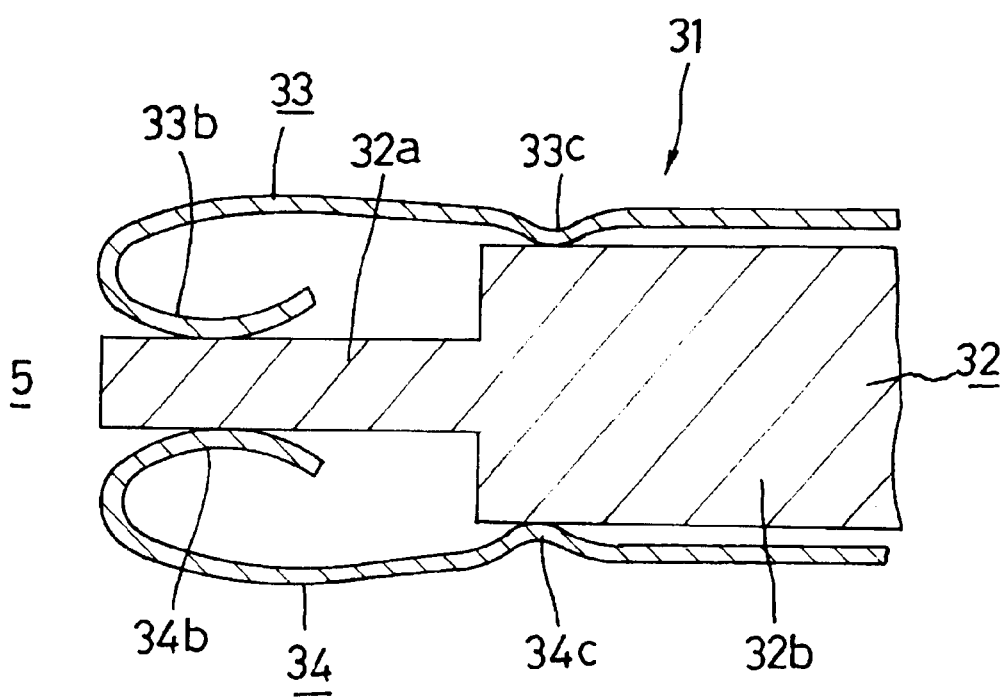
FIG. 5 is a sectional view of a laminated gasket constructed according to a fourth embodiment of the invention.

FIG. 5 shows a sectional view of a laminated gasket constructed according a fourth embodiment of the invention.

A laminated gasket 31 according to the fourth embodiment is the same as the third embodiment in terms of the structure of a step-like thin-walled portion 32a formed on a core plate 32, but differs from the third embodiment in that the seal portions 25 of the third embodiment are replaced by beads 33c, 34c formed on elastic plates 33, 34 and in that these beads 33c, 34c are in contact with a thick-walled portion 32b of the core plate 32 while folded-back portions 33b, 34b being in contact with the step-like thin-walled portion 32a.

Figure 6:
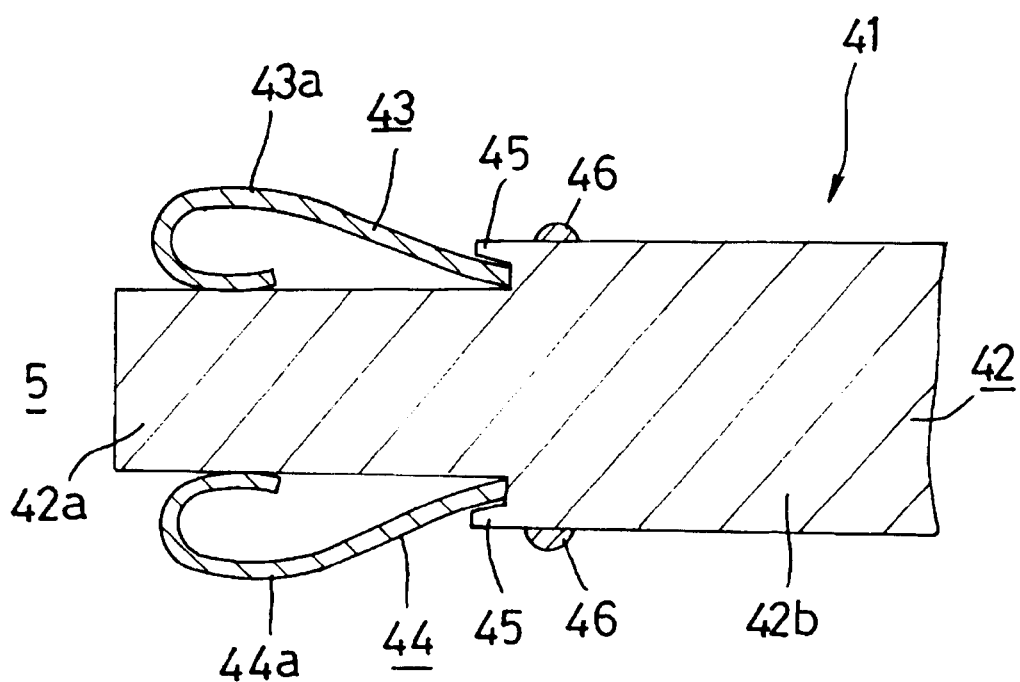
FIG. 6 is a sectional view of a laminated gasket constructed according to a fifth embodiment of the invention.

FIG. 6 shows a sectional view of a laminated gasket constructed according a fifth embodiment of the invention.

In a laminated gasket 41 according to the fifth embodiment, a core plate 42 has a step-like thin-walled portion 42a, similarly to the third and fourth embodiments. A thick-walled portion 42b of the core plate 42 has projecting portions 45 on its lead end. Base portions 43a, 44a of elastic plates 43, 44 are pinched by the projecting portions 45 and secured to the core plate 42 by means of caulking or the like. The width of the base portions 43a, 44a is within the range equal to the width of the step-like thin-walled portion 42a. In order to achieve a double sealing structure, seal portions 46 made of a soft sealing material are formed on the thick-walled portion 42b of the core plate 42. Thus, the elastic plates 43, 44 are not in contact with the thick-walled portion 42b of the core plate 42.

According to the structure of the present embodiment, since the elastic plates 43, 44 are not laminated to the thick-walled portion 42b of the core plate 42, the resultant laminated gasket can be formed in a much simpler structure as a whole.

In cases where a high heat conductive material such as aluminum and aluminum alloys is used as the material of the core plate 42 in the structure of the present embodiment, not only can good heat transfer between the combustion chamber—the cylinder head—the cylinder block be achieved, but also it is effective in improving the durability of the gasket and, in consequence, the performance of the engine.

Figure 7:
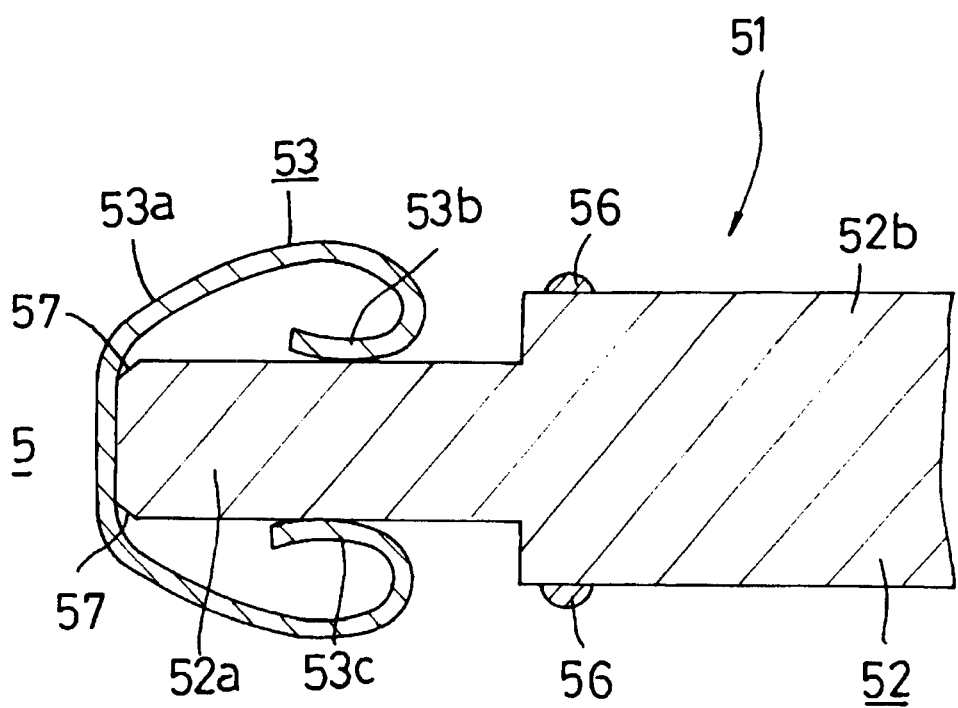
FIG. 7 is a sectional view of a laminated gasket constructed according to a sixth embodiment of the invention.

FIG. 7 shows a sectional view of a laminated gasket constructed according a sixth embodiment of the invention.

In a laminated gasket 51 of the sixth embodiment, a step-like thin-walled portion 52a is formed on a core plate 52 like the foregoing embodiments. An elastic plate 53 holds, at its base portion 53a, an end of the step-like thin-walled portion 52a of the core plate 52 in a manner similar to a grommet. Folded-back portions 53b, 53c formed on both ends of the base portion 53a are in contact with the step-like thin-walled portion 52a, and the elastic plate 53 is not in contact with a thick-walled portion 52b formed in the core plate 52. Like the foregoing embodiment, seal portions 56 made of a soft sealing material are formed on the thick-walled portion 52b of the core plate 52 to achieve a double sealing structure. By forming chamfered portions 57 on the corners of the end of the core plate 52, the rounded parts of the grommet-like portions can be prevented from cracking. With this arrangement, a laminated gasket of a simple structure can be achieved like the fifth embodiment.

In each of the foregoing embodiments, the materials of the core plate and the elastic plates may be selected from any of metallic materials and resinous materials. In the case of metal plates, aluminum, aluminum alloys, and titanium—aluminum alloys may be used.

The elastic plates laminated to both surfaces of the core plate may be different from each other in material, the shape of the folded-back portion and the shape of the bead, but it is preferable that they be symmetrical with respect to the center line of the cross section of the core plate, the center line extending in the same direction as the extending direction of the core plate.

The folded-back portions may be partly varied in width or in the height of the clearance, around their respectively associated bore openings.

The beads may be formed as half beads. Alternatively, either of the beads may be formed as a half bead while the other being formed as a full bead. In addition, the beads may be allowed to meat each other by a known means in the area between the bore openings.

The surfaces of the core plate and the elastic plates may be partly or entirely treated by known coating. Additionally, seals made of a soft sealing material such as graphite, rubber and urethane high polymer materials may be locally employed. Further, if necessary, a bead plate or shim plate may be laminated to the outer surfaces of the elastic plates having the folded-back portions.

What is claimed is:

1. A laminated gasket which has a core plate and elastic plates laminated to both surfaces of the core plate,
   wherein the core plate has thin-walled portions each of which surrounds a bore opening and a thick-walled portion extending outwardly from the thin-walled portions, and
   wherein each of the elastic plates has (a) folded-back portions for a first seal, each of which is formed so as to create, together with a base portion, a clearance around its associated bore opening and (b) beads for a second seal, each of which is formed outside its associated folded-back portion.

2. A laminated gasket according to claim 1, in which each of the thin-walled portions is an inclined thin-walled portion which gradually becomes thinner toward its associated bore opening and in which the folded-back portions and beads of the elastic plates are in contact with their associated inclined thin-walled portion.

3. A laminated gasket according to claim 1, in which each of the thin-walled portions is a step-like thin-walled portion formed by thinning a part on the side of each bore opening and in which the folded-back portions of the elastic plates are in contact with their associated step-like thin-walled portion whereas the beads of the elastic plates are in contact with the thick-walled portion.

4. A laminated gasket which has a core plate and elastic plates laminated to both surfaces of the core plate,
   wherein the core plate has thin-walled portions each of which surrounds a bore opening and a thick-walled portion extending outwardly from the thin-walled portions, and
   wherein each of the elastic plates has (a) folded-back portions for a first seal, each of which is formed so as to create, together with a base portion, a clearance around its associated bore opening and (b) seal portions for a second seal, each of which is made of a soft sealing material and positioned outside its associated folded-back portion.

5. A laminated gasket according to claim 4, in which each of the thin-walled portions is an inclined thin-walled portion which gradually becomes thinner toward its associated bore opening and in which the folded-back portions of the elastic plates are in contact with their associated inclined thin-walled portion.

6. A laminated gasket according to claim 4, in which each of the thin-walled portions is a step-like thin-walled portion which is formed by thinning a part on the side of each bore opening and in which the folded-back portions of the elastic plates are in contact with their associated step-like thin-walled portion.

7. A laminated gasket which has a core plate and elastic plates laminated to both surfaces of the core plate,
   wherein the core plate has (a) thin-walled portions each of which surrounds a bore opening, (b) a thick-walled portion extending outwardly from the thin-walled portions and (c) seal portions for a second seal, made of a soft sealing material and formed on the thin-walled portions and/or the thick-walled portion, and
   wherein each of the elastic plates has folded-back portions for a first seal, each of which is formed so as to create, together with a base portion, a clearance around its associated bore opening.

8. A laminated gasket according to claim 7, in which each of the thin-walled portions is an inclined thin-walled portion which gradually becomes thinner toward its associated bore opening and in which the folded-back portions of the elastic plates are in contact with their associated inclined thin-walled portion.

9. A laminated gasket according to claim 7, in which each of the thin-walled portions is a step-like thin-walled portion which is formed by thinning a part on the side of each bore opening, in which the folded-back portions of the elastic plates are in contact with their associated step-like thin-walled portion, and in which the radial length of the base portions of the elastic plates is within the range equal to the radial length of the step-like thin-walled portions and the elastic plates are not in contact with the thick-walled portion of the core plate.

10. A laminated gasket according to claim 7, in which each of the thin-walled portions is a step-like thin-walled portion which is formed by thinning a part on the side of each bore opening, in which the folded-back portions of each elastic plate are in contact with their associated step-like thin-walled portion, and in which the base portion of each elastic plate holds an end of the step-like thin-walled portion and the elastic plates are not in contact with the thick-walled portion of the core plate.

* * * * *